(12) United States Patent
Jukes et al.

(10) Patent No.: US 6,505,518 B1
(45) Date of Patent: Jan. 14, 2003

(54) PROCESS FOR ACTIVATING AN OSCILLATOR AND POWER SUPPLY CIRCUIT SYSTEM FOR AN OSCILLATOR

(75) Inventors: Edward P. Jukes, Wellingborough (GB); Stephen J. Wood, Kettering (GB)

(73) Assignee: Krohne AG (CH)

( * ) Notice: Subject to any disclaimer, the term of this patent is extended or adjusted under 35 U.S.C. 154(b) by 0 days.

(21) Appl. No.: 09/637,727

(22) Filed: Aug. 11, 2000

(30) Foreign Application Priority Data

Aug. 20, 1999 (DE) .......................... 199 39 157

(51) Int. Cl.$^7$ ............................... G01F 1/84
(52) U.S. Cl. ..................... 73/861.356; 73/861.355
(58) Field of Search .................... 73/861.356; 78/861

(56) References Cited

U.S. PATENT DOCUMENTS

| | | | | |
|---|---|---|---|---|
| 4,467,644 A | * | 8/1984 | Palmer et al. | 73/198 |
| 4,655,089 A | * | 4/1987 | Kappelt et al. | 73/861.356 |
| 4,708,022 A | * | 11/1987 | Johnson | 73/861.28 |
| 4,793,195 A | | 12/1988 | Koning | 74/5.6 |
| 5,557,076 A | * | 9/1996 | Wieczorek et al. | 178/19 |
| 5,678,643 A | * | 10/1997 | Robbins et al. | 166/255.2 |
| 5,777,238 A | * | 7/1998 | Fletcher-Haynes | 73/861.31 |
| 6,073,495 A | * | 6/2000 | Stadler | 73/861.356 |

FOREIGN PATENT DOCUMENTS

| | | |
|---|---|---|
| DE | 689 19196 T2 | 6/1990 |
| DE | 44 23 168 C2 | 1/1996 |
| DE | 68919196 | 4/1996 |
| DE | 4423168 C | 9/1998 |
| EP | 0 691 528 A2 | 2/1996 |
| EP | 0 691 528 A3 | 9/1997 |

OTHER PUBLICATIONS

P.D. Wilson, R.S. Spraggs and S.P. Hopkins. Universal sesor interface chip (USIC): specification and applications outline. Sesor Review, vol. 16, No. 1 1996. pp. 18–21.

Peter Hille, Rainer Hohler, Hans Strack. A linearisation and compensation method for integrated sensors. Elsevier Science S.A. 1994. pp 95–102.

* cited by examiner

*Primary Examiner*—Benjamin R. Fuller
*Assistant Examiner*—Lilybett Martir
(74) *Attorney, Agent, or Firm*—Cesari & McKenna LLP

(57) ABSTRACT

A process for activating an oscillator serving to oscillate a Coriolis line of a Coriolis mass flowmeter for moving fluids, and of a power supply circuit system for an oscillator of a mass flowmeter for moving fluids operating by the Coriolis principle. The oscillator is supplied a pulse-width-modulated pulsed sinusoidal signal. The resulting heat-loss reduction in an amplifier circuit leads to a better utilization of the energy available for supplying the oscillator.

9 Claims, 2 Drawing Sheets

PROCESS FOR ACTIVATING AN OSCILLATOR AND POWER SUPPLY CIRCUIT SYSTEM FOR AN OSCILLATOR

BACKGROUND OF THE INVENTION

This invention relates both to a procedure for activating an oscillator which oscillates a Coriolis conduit of a Coriolis mass flowmeter for moving fluids, and to a power supply circuit system for an oscillator of a mass flowmeter for moving fluids, operating by the Coriolis principle.

The method by which a mass flowmeter measures moving fluids, employing the Coriolis principle, is based on a process whereby the Coriolis conduit of the mass flowmeter is caused to oscillate with the aid of an oscillator, which imparts a Coriolis force to the fluid passing through the Coriolis conduit, the said force, when detected, providing a measure of the amount of fluid passing through the Coriolis conduit. The oscillator typically incorporates a system consisting of a coil and a magnet in which either the coil or the magnet is rigidly connected to the Coriolis conduit, as a consequence of which an alternating excitation of this system, i.e. an alternating movement of the magnet into the coil and out of the coil, produces an oscillation of the Coriolis conduit.

Maximum efficacy of this type of oscillatory excitation of the Coriolis line is obtained, inter alia, when the oscillation is essentially excited at its intrinsic natural frequency. The oscillatory amplitude of the Coriolis conduit is typically adapted, with the aid of an amplifier circuit, to the Coriolis force to be obtained in the fluid. To that end, the actual oscillatory amplitude of the Coriolis line is captured by means of a sensor attached to the Coriolis line, the amplitude detected is compared with a setpoint amplitude, and as a function of the deviation of the captured amplitude from the setpoint amplitude a sinusoidal excitation signal is amplified by a corresponding amount and fed to the coil of the oscillator.

However, as the excitation signal is amplified, the result is a not so insignificant energy loss due to heat-induced loss in the amplifier circuitry. This has a particularly negative effect in situations where the available electrical energy constitutes a limiting factor, for instance when the system is battery-operated.

SUMMARY OF THE INVENTION

It is therefore the objective of this invention to provide a process for the activation of an oscillator serving to oscillate a Coriolis conduit of a Coriolis mass flowmeter for moving fluids, as well as a power supply circuit system for such an oscillator which makes optimal use of the electrical energy available for feeding the oscillator.

The problem first above mentioned is solved by this invention with a process whereby the oscillator is fed a pulse-width-modulated, pulsed sinusoidal signal. In other words, according to the invention, it is not a continuous but a pulsed sinusoidal signal that is fed to the oscillator. The energy transferred with the signal is controlled by pulse-width modulation of the pulsed sinusoidal signal. Since it is necessary in the case of a pulsed sinusoidal signal to feed essentially the same amount of energy to the oscillator as with a continuous sinusoidal signal, the amplitude of the pulse-width-modulated, pulsed sinusoidal signal will always be greater in all non-zero areas than the amplitude of a continuous sinusoidal signal.

In this fashion, the excitation signal in the case of the pulse-width-modulated, pulsed sinusoidal signal is held at a level substantially closer to the maximum signal strength attainable with the amplifier circuit than is true for the continuous sinusoidal signal. By the same token, optimum efficiency of the amplifier circuit is obtained only in the fully closed or fully open state. In the intermediate amplification ranges, however, significant energy losses are sustained due to heat losses within the amplifier circuit system, although these energy losses diminish with progressively increasing transmittance of the amplifier circuit. It follows that in the case of a pulse-width-modulated, pulsed sinusoidal signal there is significantly more efficacious signal amplification than for a continuous sinusoidal signal, given the lower level of heat loss with pulse-width-modulated pulsed sinusoidal signals. In the areas between the pulses of the pulse-width-modulated pulsed sinusoidal signals, meaning the intervals in which the pulse-width-modulated pulsed sinusoidal signal equals zero, amplification efficiency is optimal anyway since no current is flowing and consequently no current can generate heat loss.

In a particularly advantageous implementation of the process according to this invention, the pulse-width-modulated pulsed sinusoidal signal is generated with the aid of a multiplexer by means of which a pulse-width-modulated signal is multiplied by an unpulsed sinusoidal signal of a constant, predetermined frequency.

The pulse-duty factor of the pulse-width-modulated signal, i.e. the width of the individual pulses of the pulse-width-modulated signal relative to their mutual spacing, is preferably set with the aid of a proportional integral differential (PID) controller. Only the pulse width is changed while their mutual spacing is left constant.

A particularly effective regulation of the pulse-width modulation is obtainable when, in setting the pulse-duty factor of the pulse-width-modulated signal in the PID controller, an allowance is made for an error signal which is derived from the difference between the deflection of the Coriolis line as measured by a sensor and a predetermined deflection setpoint value. Such control is further simplified in desirable fashion by keeping the amplitude of the pulse-width-modulated signal constant.

It is also desirable for the frequency of the pulse-width-modulated signal to be significantly higher than the frequency of the unpulsed sinusoidal signal. Indeed, if the frequency of the unpulsed sinusoidal signal essentially corresponds to the resonant frequency of the Coriolis line, there will be virtually no transfer of vibrations to the Coriolis line within the frequency range of the pulse-width-modulated signal, thus preventing any further energy losses due to spurious oscillations of the Coriolis line.

The problem first above mentioned is also solved, according to this invention, by means of a power supply circuit system in which the oscillator of the mass flowmeter can be activated by the power supply circuit with a pulse-width-modulated pulsed sinusoidal signal. In this case the output end of the power supply circuit is preferably provided with an amplifier by way of which the oscillator is powered.

Also, according to this invention, the power supply circuit system includes a desirable feature in the form of a multiplexer by means of which a pulse-width-modulated signal can be multiplied with an unpulsed sinusoidal signal of a constant, predetermined frequency.

Finally, the power supply circuitry is preferably equipped with a gate array incorporating a PID controller with the aid of which the pulse duty factor of the pulse-width-modulated signal can be selected.

BRIEF DESCRIPTION OF THE DRAWINGS

There are numerous individual possibilities to implement and further enhance the oscillator-activating process according to this invention, as well as the oscillator power supply circuit system according to this invention. In this context, reference is made to the dependent claims following the independent patent claims and to the description of a preferred embodiment in conjunction with the attached drawing, in which:

DETAILED DESCRIPTION OF THE INVENTION

Figure 1:
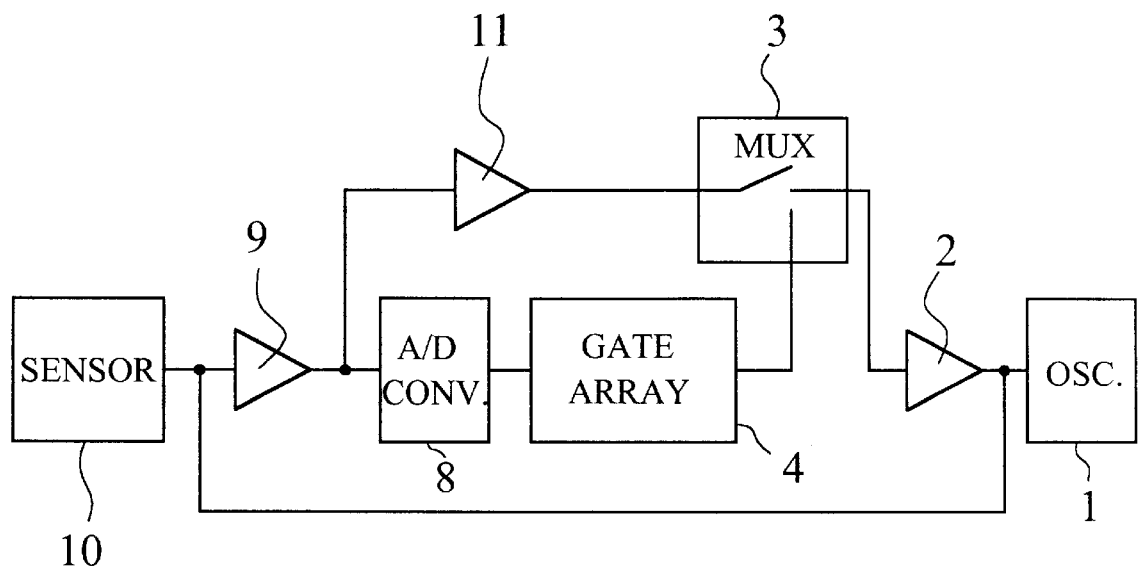
FIG. 1 is a schematic illustration of an oscillator power supply circuit according to an embodiment of this invention.

FIG. 1 is a schematic representation of a power supply circuit system according to this invention, for use with the oscillator of a Coriolis mass flowmeter for moving fluids. The oscillatory excitation of the Coriolis line is produced by an oscillator 1 incorporating a coil, not shown, and, attached to the Coriolis line, a magnet, again not shown. The oscillator 1 is powered by an amplifier 2 provided on the output side of the power supply circuit. The amplifier 2 on its part is fed a signal generated in a multiplexer 3.

Figure 2:
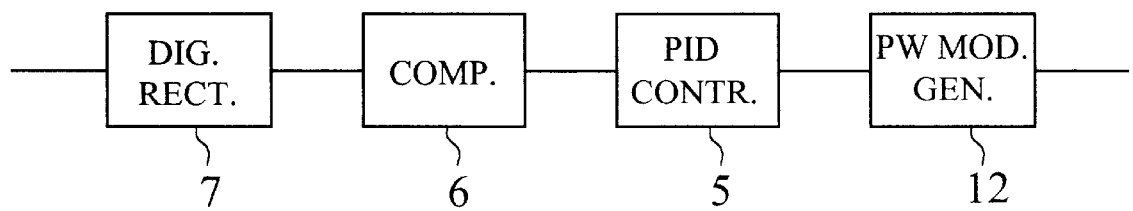
FIG. 2 is a schematic illustration of the random-programmable gate array in the FIG. 1 embodiment of this invention.

The multiplexer 3 is activated by a random-programmable gate array 4 whose design concept is schematically outlined in FIG. 2. The random-programmable gate array 4 includes a PID controller 5, a comparator 6 and a digital rectifier 7. By way of an A/D converter 8 and an amplifier 9, provided on the input side of the power supply circuit, the gate array 4 is connected to a sensor 10 attached to the Coriolis conduit line.

Figure 3:
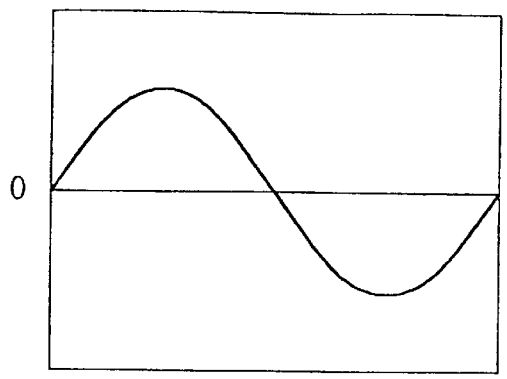
FIG. 3 shows an unpulsed sinusoidal signal.
Figure 4:
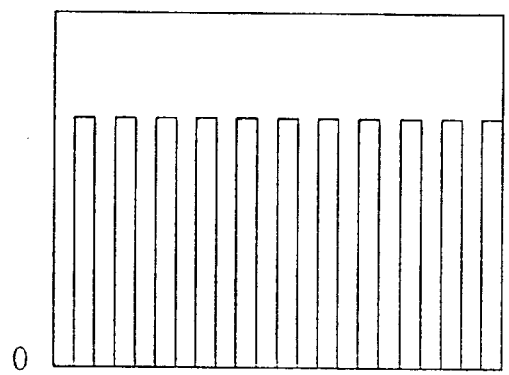
FIG. 4 shows a pulse-width-modulated signal.

By way of a series-connected amplifier 11, the multiplexer 3 on its part receives a signal captured by the sensor 10 on the Coriolis line and amplified by the amplifier 9 on the power-supply input side. This signal is essentially a continuous, unpulsed sinusoidal signal as shown in FIG. 3. The signal fed by the random-programmable gate array 4 to the multiplexer 3 is a pulse-width-modulated signal of a constant frequency as shown in FIG. 4.

The signal captured by the sensor 10 and amplified by the input amplifier 9 is digitized in the A/D converter 8 and then fed to the random-programmable gate array 4. There, the signal is first rectified by means of the digital rectifier 7 and then compared by the comparator 6 with a setpoint value for the amplitude of the oscillation of the Coriolis line. As a function of the difference between that setpoint value and the captured, actual value of the oscillation amplitude, the comparator 6 produces an error value F.

The error value F is then processed in accordance with the equation $$A = S + K \cdot F + \frac{K}{T_i} \int F dt + K \cdot T_d \frac{dF}{dt}$$

for the calculation of a value for the pulse-width modulation, where A is the output signal of the PID controller, S is the signal for maintaining the setpoint value, K is the gain factor, $T_i$ is the integration time and $T_d$ is the differentiation time.

Figure 5:
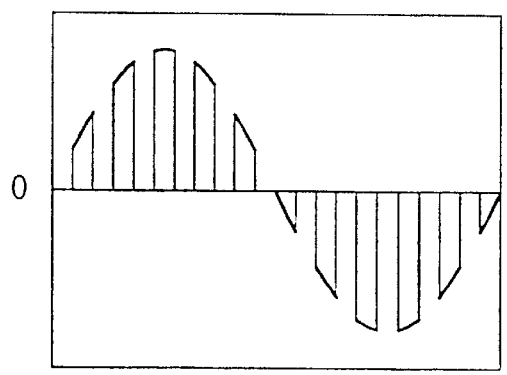
FIG. 5 shows a pulse-width-modulated pulsed sinusoidal signal generated with a multiplexer.

Finally, with the aid of the value calculated for the pulse-width modulation, a pulse-width modulation generator 12, itself contained in the gate array 4, generates the pulse-width-modulated signal which is then fed to the multiplexer 3. The continuous sinusoidal signal according to FIG. 3 is then multiplied in the multiplexer 3 with the pulse-width-modulated signal according to FIG. 4. The result, as shown in FIG. 5, is a pulse-width-modulated pulsed sinusoidal signal which, by way of the output amplifier 2, is used to feed the oscillator 1.

The layout described provides a control circuit which serves to establish the width of the individual pulses of the pulse-width-modulated pulsed sinusoidal signal as a function of both the actual oscillation amplitude of the Coriolis line and the desired oscillation amplitude of the Coriolis line.

Figure 6:
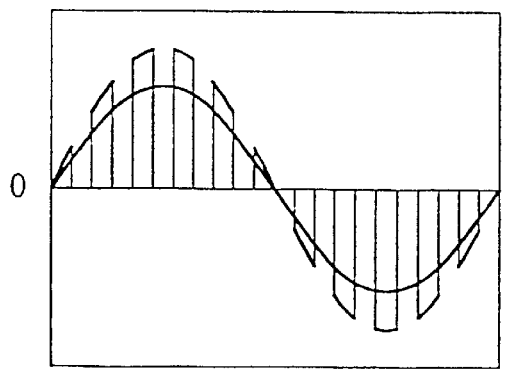
FIG. 6 shows a continuous sinusoidal signal and, for comparison, a pulse-width-modulated pulsed sinusoidal signal, each with the same overall amplitude.

As can be seen in FIG. 6, the efficiency of this circuit, i.e. the efficiency in the case of the pulse-width-modulated pulsed sinusoidal signal, is substantially greater than in a conventional circuit in which a continuous sinusoidal signal is used to feed the oscillator 1. In all areas in which the pulse-width-modulated pulsed signal is other than zero, its amplitude is significantly higher than that of the continuous sinusoidal signal. As pointed out above, the highest level of efficiency attributable to the minimal heat loss in the amplifier circuit presents itself when the amplifier—a transistorized amplifier in the embodiment according to this invention—is fully blocked or fully in the transmittance mode, and the efficiency of the non-zero signal increases with the size of the signal.

In the example depicted in FIG. 6, the pulse-width-modulated pulsed sinusoidal signal displays an efficiency level of 78% whereas the efficiency level of the continuous sinusoidal signal is a mere 55%. Indeed, the less overall energy is required to supply the oscillator, the more strongly this ratio shifts in favor of the pulse-width-modulated pulsed sinusoidal signal.

We claim:

1. A process for activating an oscillator oscillating the Coriolis conduit line of a Coriolis mass flowmeter for moving fluids comprising the steps of:
   feeding the oscillator with a pulse-width-modulated pulsed sinusoidal signal, generating the pulse-width-modulated sinusoidal signal by multiplying a pulse-width-modulated signal with an unpulsed sinusoidal signal, and generating the pulse-width-modulated signal with the aid of a random-programmable gate array.

2. The process as in claim 1, further comprising the step where, prior to being fed to the oscillator, the pulse-width-modulated sinusoidal signal is amplified in an amplifier.

3. The process as in claim 1 or 2, further comprising the step where the pulse-width-modulated sinusoidal signal is generated by means of a multiplexer.

4. The process as in claim 1, further comprising the step where a pulse-duty factor of the pulse-width-modulated signal is the random-programmable gate array with the aid of a PID controller.

5. The process as in claim 4, further comprising a step where a selection of the duty-pulse factor of the pulse-width-modulated signal is set in the PID controller with an allowance for an error signal which is derived from the difference between a deflection of the Coriolis line as measured by a sensor and a predetermined deflection setpoint value.

6. The process as in claim 5, further comprising the step where the pulse-duty factor is set according to the equation $$A = S + K \cdot F + \frac{K}{T_i} \int F dt + K \cdot T_d \frac{dF}{dt}$$

where A is the output signal of the PID controller, S is the signal for maintaining the set-point value, F is the error signal, K is the gain factor, $T_i$ is the integration time and $T_d$ is the differentiation time.

7. The process as in claim 1, wherein the step of feeding the pulse-with-modulated signal includes feeding said signal at a constant amplitude.

8. The process as in claim 1, comprising the step of further providing the frequency of the pulse-width-modulated signal at a frequency that is significantly higher than a frequency of the unpulsed sinusoidal signal.

9. The process as in claim 1, wherein the frequency of the unpulsed sinusoidal signal essentially corresponds to the resonant frequency of the Coriolis line.

* * * * *